United States Patent
Armstrong

(10) Patent No.: US 9,941,919 B2
(45) Date of Patent: Apr. 10, 2018

(54) CASE FOR A COMPUTING DEVICE

(71) Applicant: URBAN ARMOR GEAR, LLC, Laguna Niguel, CA (US)

(72) Inventor: Steve Armstrong, Laguna Niguel, CA (US)

(73) Assignee: URBAN ARMOR GEAR, LLC, Laguna Nigel, CA (US)

( * ) Notice: Subject to any disclaimer, the term of this patent is extended or adjusted under 35 U.S.C. 154(b) by 0 days.

(21) Appl. No.: 15/368,365

(22) Filed: Dec. 2, 2016

(65) Prior Publication Data
US 2017/0163306 A1    Jun. 8, 2017

Related U.S. Application Data

(60) Provisional application No. 62/263,557, filed on Dec. 4, 2015.

(51) Int. Cl.
*H04B 1/3888*    (2015.01)

(52) U.S. Cl.
CPC .................. *H04B 1/3888* (2013.01)

(58) Field of Classification Search
CPC . H04B 1/3833; H04B 1/3888; H04M 1/0202; H04M 1/0283; H04M 1/185; B29D 24/001; A45C 11/00; A45C 13/36; G06F 1/1633
See application file for complete search history.

(56) References Cited

U.S. PATENT DOCUMENTS

| | | | | |
|---|---|---|---|---|
| 2011/0077061 A1* | 3/2011 | Danze | .................. | H04M 1/185 455/575.1 |
| 2013/0296004 A1* | 11/2013 | Tages | .................... | H04M 1/185 455/575.8 |
| 2014/0251368 A1* | 9/2014 | Lawson | ................. | A45C 11/00 132/287 |
| 2015/0141082 A1* | 5/2015 | Ehrlich | ................ | H04B 1/3888 455/575.1 |

* cited by examiner

*Primary Examiner* — Thanh Le
(74) *Attorney, Agent, or Firm* — Troutman Sanders LLP

(57) ABSTRACT

A system for protecting an electronic device and securely and conveniently carrying tangible portable contents therewith. The system may include a resilient portion dimensioned to detachably receive the electronic device by a continuous perimetral edge. The electronic device may be secured thereto by an inwardly extending, retaining lip of the perimetral edge. A rigid portion may be detachably connected to a rear surface of the resilient portion opposite the electronic device. The rigid portion may be dimensioned to shield at least part of the rear surface of the rigid portion. A cavity may be defined between the rigid portion and the rear surface of the resilient portion when the rigid portion is in a closed position. The cavity is operable to secure the tangible contents in the closed position and receive the tangible contents in an opened position.

5 Claims, 7 Drawing Sheets

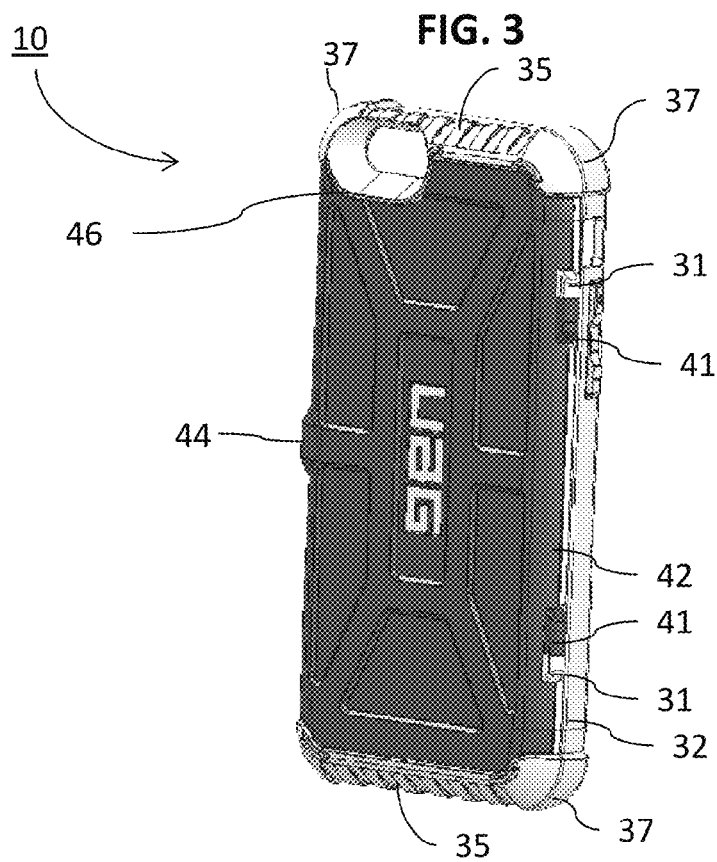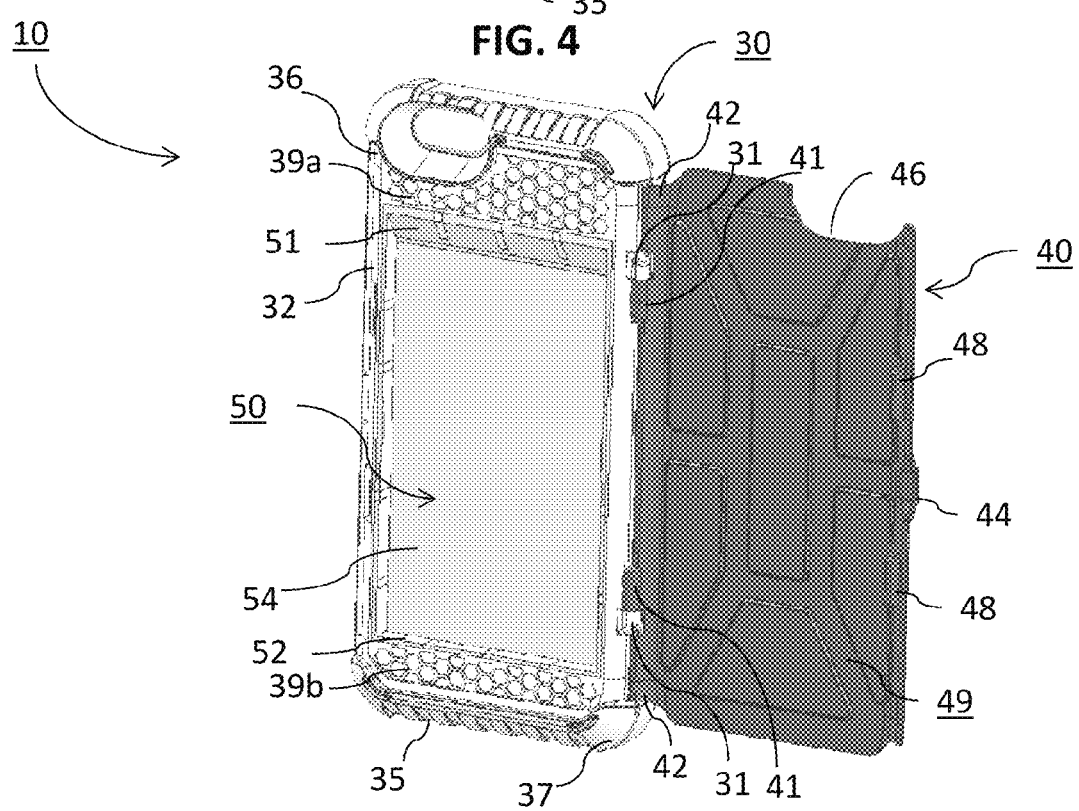

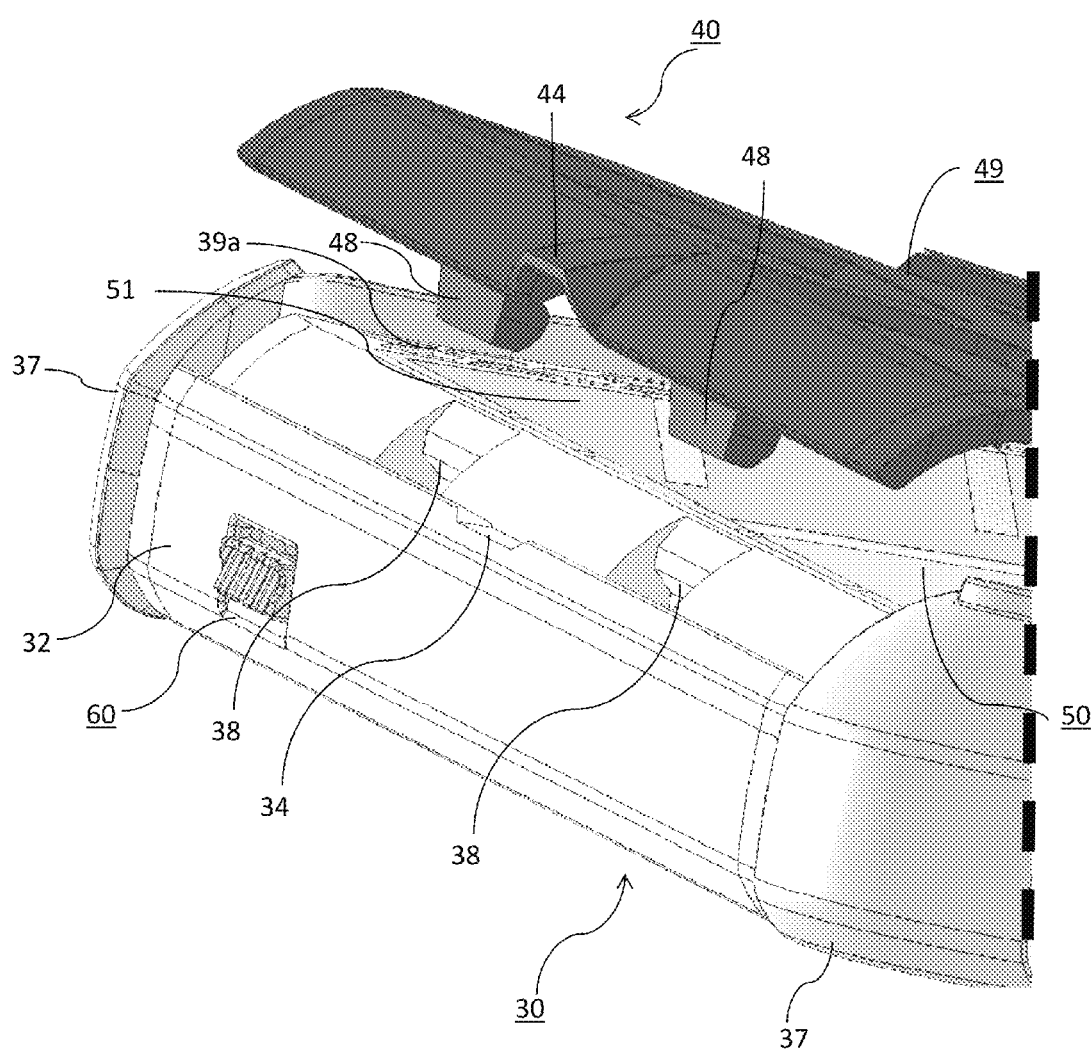

CASE FOR A COMPUTING DEVICE

CROSS-REFERENCE TO RELATED APPLICATION

This Application claims priority to and benefit under 35 U.S.C § 119(e) of U.S. Provisional Patent Application Ser. No. 62/263,557, filed Dec. 4, 2015, the contents of which are hereby incorporated by reference in their entirety as if fully set forth below.

FIELD

This disclosure relates generally to protective cases for portable electronic devices and more particularly, protective cases for electronic devices such as smart phones, tablets, PDAs, and laptops.

BACKGROUND

With increasing regularity, protective cases are being constructed for a variety of computing devices such as smart phones, tablets, PDAs and/or other portable computing devices. Their respective designs vary, ranging between degrees of protection as well as facilitating use of the computing device in a more protected environment.

Cases have been known to be constructed from molding using silicon or thermoplastic polyurethane rubber that provides some basic protection against drops and scratches. Other case designs have been constructed from relatively rigid injected plastics such as polycarbonate. The design and construction of the known cases therefore vary depending on the desired amount of protection, costs, and consideration for certain materials and mounting schemes balanced with features that facilitate performance of the computing device itself. For example, a certain material may provide basic structural protection and be relatively cheap, but this material may induce too much friction (e.g. grip) to the user that interferes with easy attachment of the case with the device or grip with other articles such as parts of the user's body or other objects foreign to the case.

Cases can also suffer from being too bulky and difficult to stow away. It is also known that materials for certain cases can degrade over time thereby diminishing protective capabilities of the case as well as loosening its attachment with the computing device. Aesthetically, a worn case also diminishes the overall impression of the case and the attached computing device. Such cases can also have reduced bulk versus their rubber counterparts and be difficult to carry around. This is particularly problematic when with bulky cases where the end-user may have to decide, for example, between carrying the electronic device or their wallet. Additionally, plastic injected mold cases can suffer from passing on relatively high material stresses to the electronic device itself due to the differing elasticity and cushioning. For such devices with sensitive displays or input mediums, such protection therefore may not be desirous.

Yet, stress tests to the computing devices used with known solutions caused by normal use through drops or collisions can lead to device damage and case separation. In turn, the user may have to fix the device, buy a new one, and/or re-assemble the case. Therefore, a need exists to resolve these and other problems in the art.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In some embodiments, a composite case for an electronic device may include a resilient portion dimensioned to detachably receive the electronic device. A rigid portion may be detachably connected to a rear surface of the resilient portion, the rigid portion being dimensioned to shield at least part of the rear surface of the rigid portion. Preferably, the rigid portion may cover the majority of rear surface of the resilient portion and may preferably extend between the base portions of resilient portion as described more particularly below. A cavity may be formed between the rigid portion and the rear surface of the resilient portion when the rigid portion is in a closed position, the cavity being operable to detachably receive and store tangible contents of the end-user (e.g. cards, cash, keys, or other personal effects). The cavity may be sized to securely store at least 5 credit cards or similarly sized effects. However, the cavity is not so limited and may be operable to store more than 5 credit cards including up to 10 credit cards or also less than 5 credit cards.

In some embodiments, the resilient portion may include upper and lower portions with reinforced structure defined between the inner and rear surface of the resilient portion. Such reinforced structure may include a honeycomb structure as described more particularly below. The upper and lower structure may also be in communication through one or more perimetral walls which may also include reinforced structure. In this embodiment, the cavity of the case may be defined between an inner surface of the rigid portion and the upper, lower, and one or more perimetral reinforced wall structures of the resilient portion.

The inner surface of the cavity may be elastic, pliable and/or relatively thin as compared with other portions of the cavity such as the reinforced wall structures or its upper and lower portions. In this respect, a volume of the cavity can be adjustable by stretching or moving an inner surface between the upper, lower, and one or more perimetral reinforced wall structures. Optionally, one or more actuator surfaces or cutouts may be incorporated in one or both of the rigid and resilient portions that are dimensioned to align with actuators of the electronic device when the electronic device is detachably received in the case.

In some embodiments, the case, the rigid and resilient portion may be generally rectangular. However, any shape and design may be used as needed or required. Similarly, the cavity formed between the rigid and resilient portions may be generally rectangular with a sloped upper surface for slidably inserting contents within the cavity.

To facilitate easily moving the rigid portion between opened and closed positions, the resilient portion may include one or more hinged fasteners positioned along a perimetral edge. Each of the one or more fasteners of the resilient portion may hingedly engage with associated hinged fasteners of the rigid portion. In this respect, the case may be moveable between positions so that contents can be detachably or slideably inserted into the cavity. In contrast, in the closed position contents in the cavity can be safely and securely sealed between the rigid and resilient portions. Preferably, the rigid portion may be rotatable about its one or more hinged fasteners and in the closed state the rigid and resilient portion are substantially parallel with each other.

In some embodiments, one or more fasteners of the rigid portion for securing the rigid portion in the closed position may be preferably positioned on an edge opposite its one or more hinged fasteners. These fasteners may extend outwardly from the rigid portion and terminate with an inwardly extending lip. Preferably, one or more corresponding fasteners of the resilient portion may be provided to securely receive and engage with the inwardly extending lip of the fasteners of the rigid portion. The fasteners of the resilient portion may be defined by a cutout, recess, or void of the perimetral reinforced structure dimensioned to receive and securely engage with the inwardly extending lip of the rigid portion.

When engaging and securing the rigid portion to the resilient portion in this embodiment, either or both of the resilient portion and rigid portion may flex when contacted by the inwardly extending lip until the inwardly extending lip of the rigid portion is positioned securely with a corresponding receiver of the resilient portion in the closed position. An actuator surface may also be raised away from rigid portion opposite the inwardly extending lip in a manner sufficient in with a predetermined contour to receive actuating movement from a user. In this respect, the actuator surface may be operable to be moved by a user to move the rigid portion between closed and open positions.

The rigid portion may be substantially transparent and the resilient portion may be substantially opaque. Additionally, the rigid portion may be defined by an array of raised, reinforced, or otherwise thicker sections arranged for increased bending stiffness and impact resistance. The resilient and rigid portions may each be molded from a homogenous, uniform material or a plurality of different materials.

In other embodiments, a method of protecting an electronic device is disclosed. The method may include: detachably engaging a resilient portion with a rigid portion; dimensioning the resilient portion to be operable to detachably and securely receive the electronic device; dimensioning the rigid portion to shield at least part of a rear surface of the rigid portion; and forming a cavity between the rigid portion and the rear surface when the rigid portion is in a closed position, the cavity being operable to detachably store contents.

The method may also include reinforcing upper and lower portions of the resilient portion with a substantially greater stiffness than an inner surface of resilient portion disposed therebetween that defines the cavity; detachably and securely inserting the electronic device in the resilient portion opposite the rigid portion so that the rigid portion does not touch the electronic device; and/or defining the cavity between the inner surface, the perimetral structure, and the upper and lower portions. Optionally, a volume of the cavity can be adjusted by stretching or moving the inner surface, the inner surface being pliable or elastic.

In other embodiments, the method may also include hingedly connecting one or more fasteners of the resilient portion with one or more fasteners of the rigid portion across an adjoining perimetral edge; rotating the rigid portion about the hingedly connected fasteners to move the case between an opened position to the closed position; and/or aligning the rigid and resilient portions to be substantially parallel in the closed position.

Optionally, contents may be slidably inserted in the cavity when the case is in the opened position. Additionally, the method may include: extending at least two fasteners of the rigid portion outwardly therefrom and terminating in an inwardly extending lip; dimensioning associated fasteners of the resilient portion with cutouts on the perimetral reinforced structure to receive and securely engage with the inwardly extending lip of the rigid portion in the closed position; and/or positioning an actuator surface between the at least two fasteners of the rigid portion, the actuator surface raised away from the inwardly extending lip and operable to be manually moved by a user to move the case between the closed and open positions.

In other embodiments, a system for protecting an electronic device and tangible contents is disclosed. The system can include a resilient portion dimensioned to detachably receive the electronic device. The electronic device can be detachably received by the resilient portion by a continuous perimetral edge and secured by an inwardly extending retaining lip of the perimetral edge. A rigid portion can be detachably connected to a rear surface of the resilient portion opposite the electronic device. The rigid portion may be dimensioned to shield at least part of the rear surface of the rigid portion. A cavity may be defined between the rigid portion and the rear surface of the resilient portion when the rigid portion is in a closed position. In this embodiment, the cavity can be operable to secure the tangible contents in the closed position and receive the tangible contents in an opened position and the rigid portion can be rotable about a shared edge with the resilient portion between the opened and closed positions.

A variety of methods and systems of utilizing, manufacturing, and/or assembling the disclosed case is also contemplated in a variety of situations and environments. To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 3 is a rear perspective view of the case in FIG. 1 in a closed position without the electronic device.

FIG. 4 is a rear perspective view of the case in FIG. 1 in an opened position.

FIG. 10 depicts a close up of exemplary fasteners of the rigid and resilient portions of the case of FIG. 1 prior to be assembled in a closed position.

DETAILED DESCRIPTION

Figure 1:
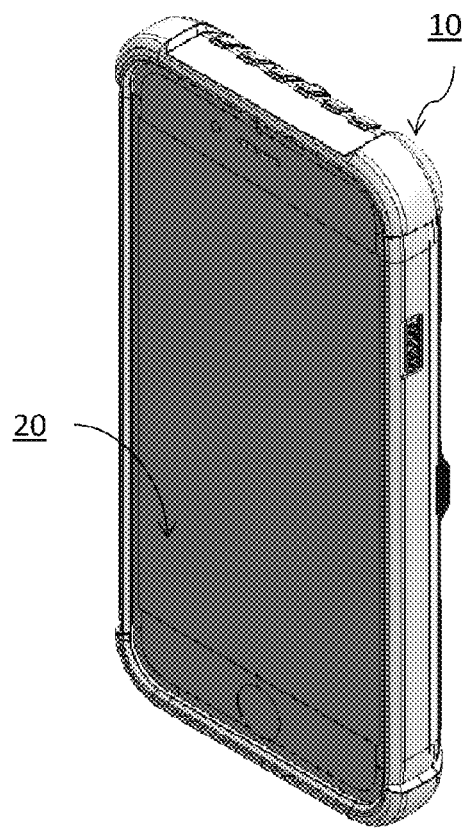
FIG. 1 is a forward perspective view of the herein described protective case for a computing device assembled with an exemplary electronic device.

The features of the presently disclosed solution may be economically molded or assembled by using one or more distinct parts and associated components which, may be assembled together for removable or integral application with a known or to-be-designed computing device case in an economical manner, wherein the features of the present disclosure may form the herein disclosed servicing apparatus regardless of the particular form. Unless defined otherwise, all terms of art, notations and other scientific terms or terminology used herein have the same meaning as is commonly understood by one of ordinary skill in the art to which this disclosure belongs.

Terms with commonly understood meanings may be defined herein for clarity and/or for ready reference, and the inclusion of such definitions herein should not necessarily be construed to represent a substantial difference over what is generally understood in the art. All patents, applications, published applications and other publications referred to herein are incorporated by reference in their entirety. If a definition set forth in this section is contrary to or otherwise inconsistent with a definition set forth in the patents, application, published applications and other publications that are herein incorporated by reference, the definition set forth in this section prevails over the definition that is incorporated herein by reference.

As used herein, "a" or "an" means "at least one" or "one or more." As used herein, the term "user", "subject", "end-user" or the like is not limited to a specific entity or person. For example, the term "user" may refer to a person who uses the systems and methods described herein, and frequently may be a technician. However, this term is not limited to end users or technicians and thus encompasses a variety of persons who can use the disclosed systems and methods.

The disclosed solution can now be better understood turning to the following detailed description. It is to be expressly understood that the illustrated embodiments are set forth as examples and not by way of limitations on the embodiments as ultimately defined in the claims. An embodiment in accordance with the present disclosure provides a cover for a computing device such as a laptop, a smart phone, a tablet or any other portable computing device. The cover can be made of multiple parts, integrally formed therewith or detachable.

It is understood that "electronic device" can mean any computing device such as a laptop, a smart phone, a tablet computing device, PDAs or the like.

"Shield" as used herein with the disclosed case can mean to protect, wrap around, or envelope a corresponding computing device in a manner that conceals the computing device from: injuries during a drop or accident such as by impact or collision; scrapes and scratches during or between uses; and/or other injuries to the outer surfaces and internal mechanisms of the device.

"Impact resistant" or "impact resistance" as it relates to the herein disclosed case features can mean any feature designed to withstand applied forces or related shock across the disclosed case and any device housed therein. Accordingly, features or materials described herein as providing impact resistance or being impact resistant utilize material properties and/or structural design of the case directed towards mitigating the effects of expected events in the life-cycle of the case and corresponding computing device that incur impact (e.g. drops, collisions, accidents, etc).

"Honeycomb design" or "honeycomb structure" as described herein is contemplated to signify any natural or man-made structure such as a plastic injected mould or composite sandwich structure that includes geometry of a honeycomb. This structure may reinforce structural integrity in the feature it is included and/or may also allow the minimization of the amount of used material to optimize feature weight and material costs.

The herein disclosed case and method of use is provided to encapsulate and protect a variety of electronic devices. Some embodiments include a two-part case made of a resilient portion and a rigid portion. The resilient portion can be injection molded TPU rubber and the rigid portion may be an injection molded polycarbonate shield.

The resilient portion, in some embodiments, may comprise one or more perimetral edge structures extending outwardly from an inner, planar surface. The perimetral edge may be continuous or multiple individual portions with a base that protects the rear of the electronic device when secured therein. Preferably, the perimetral edges of the resilient portion can form bumpers and/or inwardly extending lips operable to flex outwardly during attachment. In this respect, the inwardly extending lip may engage with the forward surface of the electronic device and provide added protection in the event of a drop or collision.

Advantageously, the resilient portion is constructed from shock resistant material and designed to secure the electronic device. Additionally, the rigid portion is independent from the resilient portion and may be operable to be moved between open and closed positions. In the closed position, a cavity is formed between the rigid and resilient portion that is opposite the electronic device. This is advantageous as it allows for secure, non-bulky methods of carrying of tangible contents with the electronic device in the same case. Such contents can include one, or a combination of, a business, credit, and/or identification cards. However, the contents are not so limited and can include anything such as cash, coins, or other articles typically stored in a wallet, purse, or pocket.

When the device is installed inside the resilient portion, the case and device are substantially coexistive through a mechanical means so that a protective system is established that provides resistance to impacts, sharp objects, shock and scratches to the device while also permitting convenient and easy transportation of other personal effects. The herein described solution may therefore form a protective system for the electronic device that securely retains and protects the device in most operating conditions including, but not limited to, the standards set forth by MIL-STD 810G, 506.6 VI while minimizing material weight and size of the case.

Figure 2:
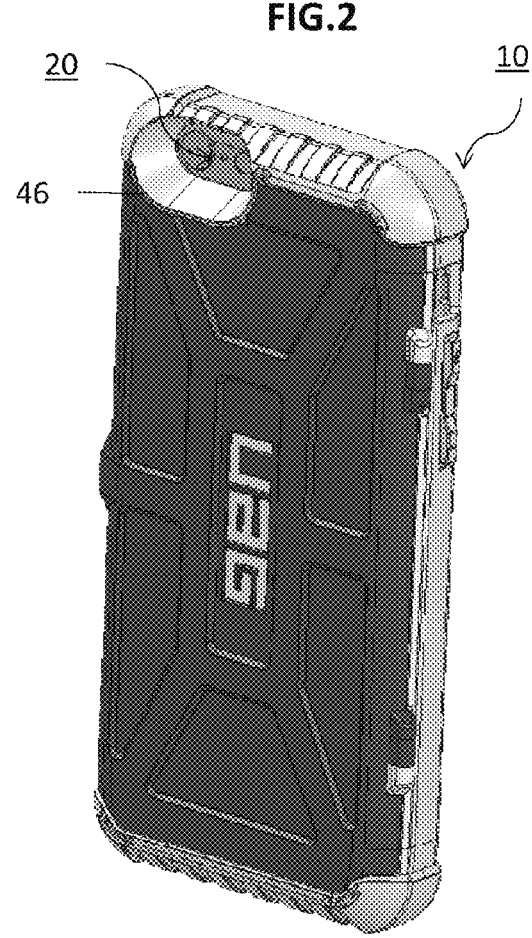
FIG. 2 is a rear perspective view of the case and device of FIG. 1.

For simplicity and illustration purposes only, a case 10 is shown in FIG. 1 housing an electronic device 20 in a forward perspective view. FIG. 2 depicts the same case 10 and device 20 but in a rear perspective view. Device 20 is depicted for illustrative purposes only and various other electronic devices are applicable including other phones, designs, sizes, and/or shapes. In particular, FIG. 2 depicts an actuator surface 46 of case 10 aligned with an optical system of device 20. However, case 10 is not so limited and instead, surface 46 may be positioned elsewhere, resized or removed entirely as needed or required.

Turning to FIG. 3, case 10 is shown in a forward, assembled view with two detachable components including a resilient portion 30 and a rigid portion 40. Rigid portion 40 may therefore have greater material stiffness and thus be substantially more rigid than resilient portion 30. In turn, portion 30 may be operable to securely receive device 20 and provide softer impact resistance to "shield" device 20 as is understood in this disclosure.

Portion 30 may include a reinforced base 35 and/or upper 35 section connected by one or more perimetral side walls 32. Walls 32 may be orthogonal with sections 35 that extend therebetween and terminate in an inwardly extending retaining lip. In this respect, walls 32 of portion 30 may be operable to flex outwardly when device 10 may be inserted therewith and the retaining lip of each wall 32 may hold device 20 in place during use. When removing the device 20 from case 10, the retaining lip may be stretched and/or moved away from the device 20 to permit the device 20 to be pried therefrom. As walls 32 may be oriented in parallel, each wall 32 may also be operable to flex away from device 20 further facilitating removal of the device 20 from case 10. It will be appreciated that other embodiments of portion 30 and its features have been described here above with reference to certain examples or embodiments but various additions, deletions, changes and alterations may be made to the above-described embodiments and examples without departing from the intended spirit of portion 30.

As can be seen, sections 35 may be reinforced structure operable to shield device 20 when securely stored in case 10. In this respect, section 35 may include one or an array of raised portions arranged in series, parallel, or in predetermined patterns to both shield device 20 while maintaining a reduced weight of portion 30 and a portable form factor of case 10. Portion 30 may also include one or a plurality of reinforced corners 37 to function in concert with section 35 to shield device 20 when stored therewith. Corners 37 and/or sections 35 may optionally include material substantially thicker than adjoining features such as walls 32. Optionally, each corner 37 may be constructed from flexible TPU rubber for additional protection of device 20 during drop or collection as well as facilitate easy insertion of the device 20 into the case 10.

FIG. 4 depicts case 10 in an opened position with portion 40 having been rotated about rotable fasteners 41 and 31. Case 10 is not limited to the fasteners of FIGS. 3-4, however, and instead any manner of fastening may be used include a single hinged connection between portions 20 and 30 or more than two shared, rotable connections between portions 20 and 30. Additionally, rotable fasteners 41 and 31 may be replaced with snap fit connectors, hook and loop fasteners, or other detachable fasteners for easy and effective fastening between portions 30 and 40.

Figure 7:
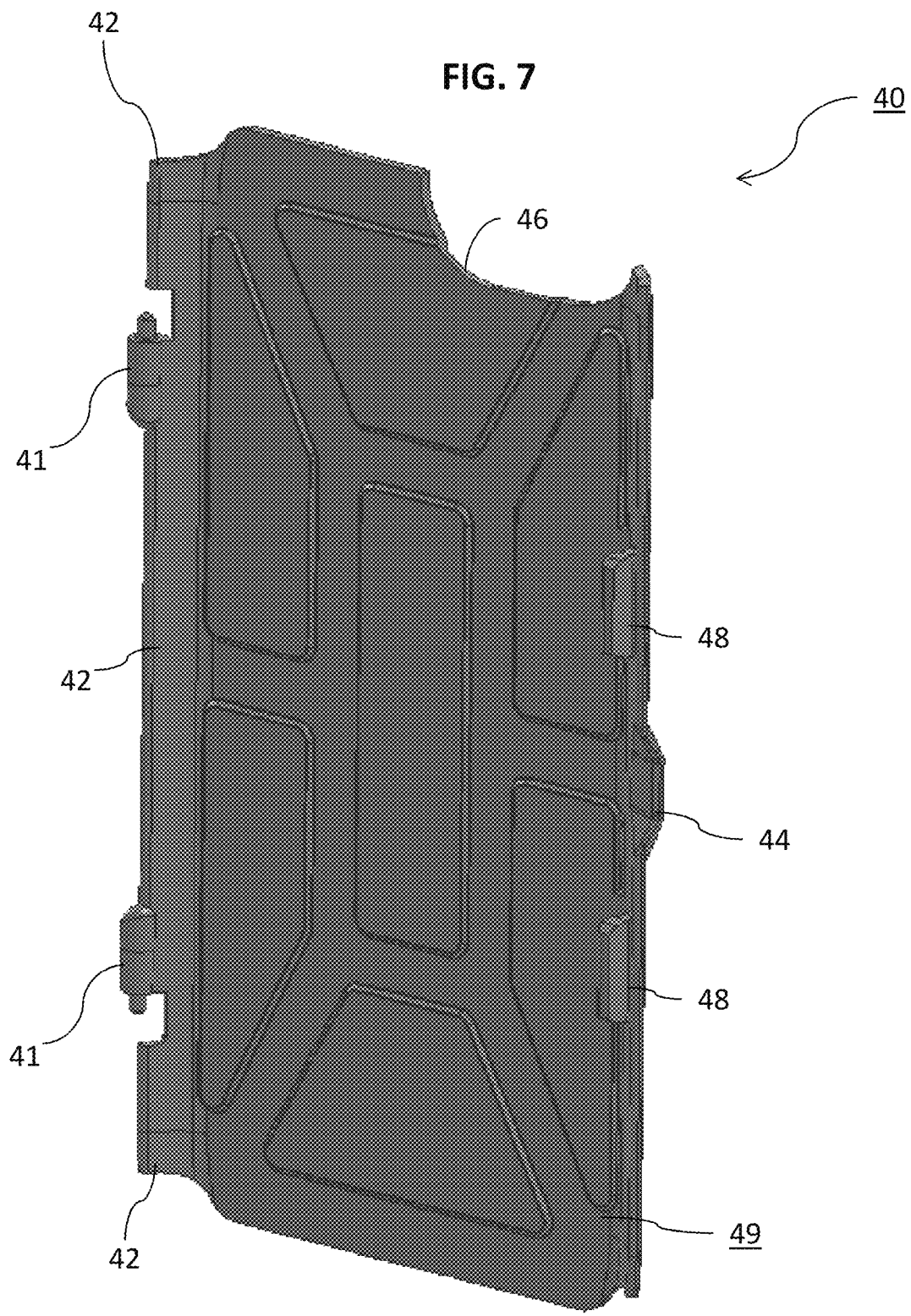
FIG. 7 depicts a perspective view of the rigid portion of the case of FIG. 1.

FIG. 7 more clearly shows a perspective view of portion 40 of FIGS. 1-4. As can be seen, fastener 41 may be positioned on the lateral, side edge 42 of portion 40 and may include a first cylindrical or rounded extruded portion that terminates in an insertable, rotable rod of relatively smaller radius than the first extrude portion. The rod of fastener 41 is operable to be received by corresponding fastener 31 of portion 30. Turning back to FIG. 4, fastener 31 may be a bored out receiver operable to receive fastener 41 so that fastener is capable of rotating therein to move portion 40 between the opened position of FIG. 4 and closed position of FIG. 3.

One or more actuator surfaces 44 may be positioned on the side edge opposite fasteners 41. Actuator surface 44 may extend upward outwardly to create a portion externally moveable by a user to drive portion 40 between the open and closed positions. Preferably, surface 44 is shaped with a contoured surface to receive the digit of a user and thus surface 44 may be contoured to a user's finger tip. Optionally, portion 30 may include an indent, void, recess, or gap 34 formed along the corresponding lateral edge of portion 30 in wall 32 to correspond with actuator surface 44 and create a gap between portions 30 and 40 at actuator surface 44 in the closed position. Advantageously, this embodiment and gap between portions 30 and 40 facilitates easy actuation of portion 40 between opened and closed positions.

One or multiple fasteners 48 may be positioned adjacent actuator surface 44. As can be more clearly seen in FIG. 10 when portion 40 is depicted just prior to being positioned in the closed position with portion 30, fastener 48 may extend outwardly therefrom and terminate in an inwardly extending lip. Due to the contour of portion 40 coupled with the flexibility of portion 30, the inwardly extending lip of fastener 40 is moved downward to contact corresponding fastener 38 of portion 30, fastener 48 will cause portion 40 to bow or flex until its inwardly extending lip can move below the retaining lip of fastener 38. As can be clearly seen in FIG. 10, each fastener 38 may be positioned to align with corresponding fasteners 48 of portion 40 and each fastener may be positioned along or adjacent the side edge 32 of portion 30. In certain embodiments, fastener 38 may be comprised of a different material such as a harder plastic (as in rigid portion 40) to ensure a secure connection having a prolonged lifespan between portion 40 and portion 30.

Preferably, fastener 38 may be defined by a void or recess in edge 32 with a retaining lip or groove operable to securely receive and retain the inwardly extending lip of fastener 48 in the closed position. In this respect, fastener 38 may be operable to secure fastener 48 in place until a predetermined actuation movement is applied to actuator surface 44. Any number of fasteners 38 and 48 may be used and any number of modifications may be made including flexibility of respective materials, depth of respective recesses and/or corresponding retaining or fastening lips. Additionally, any number of effective, detachable fastener mechanisms may be used in place of those depicted in FIG. 10.

In comparing FIGS. 3-4 and 10, it can be clearly seen that a cavity 50 is formed between portions 30 and 40 in the closed position. Cavity 50 is advantageous for the end user as case 10 allows for secure protection to device 20 while also providing capability of detachably incorporating personal effects such as credit cards, business cards, cash, loose change, keys, or the like. As known cases tend to be bulky and take up significant space in a purse or a pocket, incorporation of cavity 50 reduces bulk by allowing case 10 to be utilized as a dual purpose protective case for the electronic device as well as capability to also transport valuable tangible items.

As seen in FIGS. 4 and 10, cavity 50 may be define by an inner surface 54 that extends between walls 32 and upper 51 and lower 52 walls of cavity 50. Upper wall 51 of cavity 50 may be integrally formed with portion 30 and may be formed with upper portion 39a of portion 30. Upper wall 51 may preferably include a sloped edge for facilitating easy insertion and removal of contents in cavity 50. However, wall 51 is not so limited and may include any other shape as needed or required including being orthogonal with surface 54 or being more sloped than depicted. Similarly, wall 52 may be formed with lower portion 39b of portion 30. Surface 54 of cavity 50 forms a protective, resilient barrier between device 20 that may be housed in portion 30 opposite cavity 50. Advantageously, any contents disposed in cavity 50 will never contact or interfere with device 20 and vice versa when case 10 is in a closed position. Preferably, surface 54 is pliable such that the volume and/or shape of cavity 50 can be adjusted to fit different sized and numbers of articles therein.

Portions 39a and 39b may include substantially reinforced structure. Preferably, portions 39a and 39b include honeycomb structure that is relatively lightweight of contrastingly great material strength to counter a pliable surface 54 disposed therebetween. Portions 39a and 39b may also be integrally formed with reinforced walls 32 so that portion 30, while resilient, may also resist bending during use to further shield device balanced with sufficient resiliency.

Optionally, either of portions 30 and 40 may include actuator surfaces or cutouts to correspond with corresponding actuators or features of device 20. For example, device 20 may include a camera or other optical system such that portions 30 and 40 may each include a cutout such as respective actuator cutouts 36 and 46. However, case 10 does not require such features and any number of cutouts, recesses, or raised surfaces may be included as needed or required facilitate use of case 10 with device 20.

Figure 5:
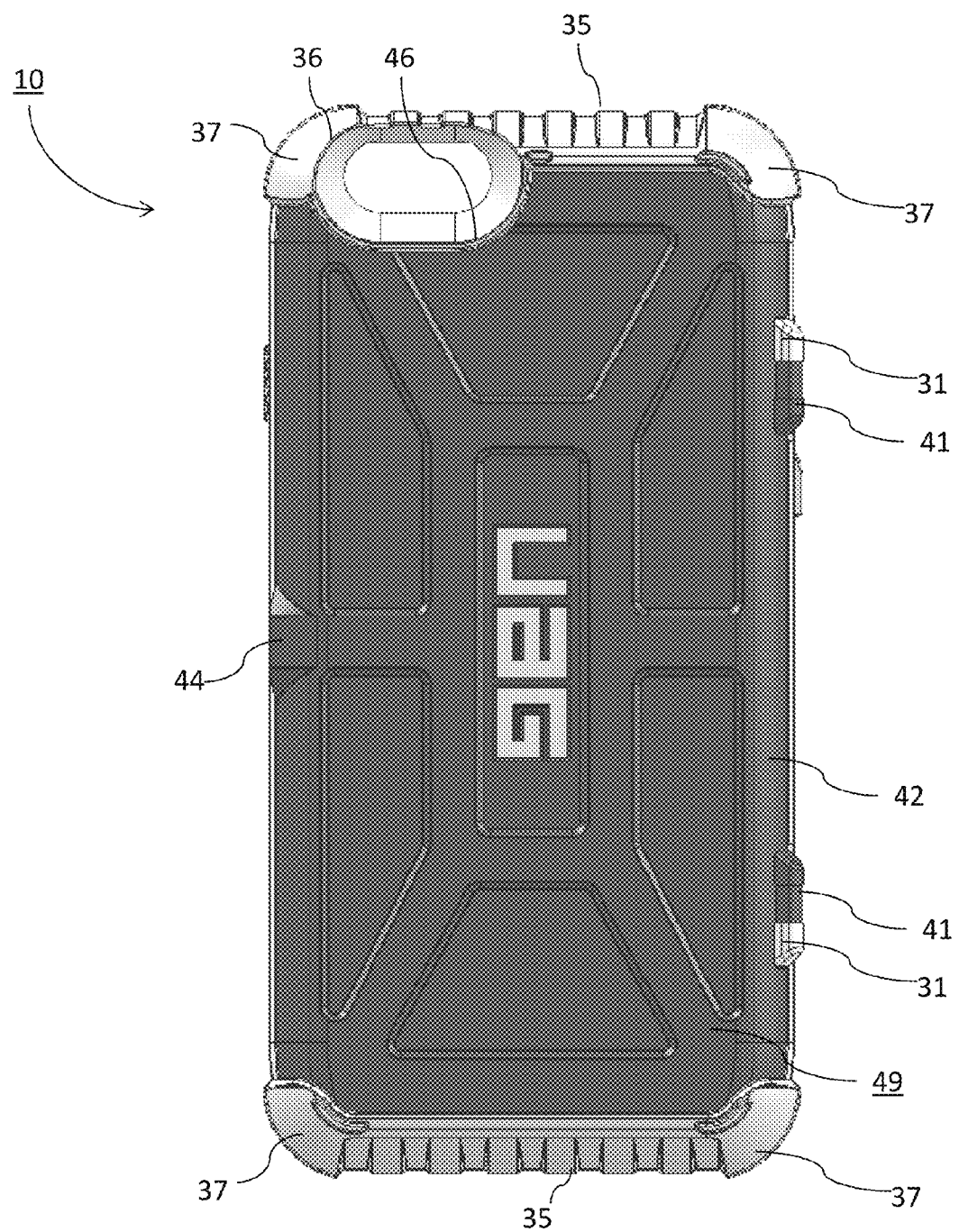
FIG. 5 is a rear plan view of the case in FIG. 1 showing its rigid and resilient portions assembled in a closed position.

Turning to FIG. 5, case 10 is depicted in a rear plan view showing more clearly how portion 40 assembles with portion 30 in the closed position. Reinforced structure 49 of portion 40 can also be seen to provide adequate protection to case 10 and any contents disposed in cavity 50 while also maintaining relatively low weight of portion 40. Portion 40 with structure 49 may appear to be embossed to form a dent in the back of portion 40 and/or may be raised therefrom in one or more portions to be farther away from the electronic device 20 and increase the volume of cavity 50. The shape illustrated of structure 49 may include other variations of this geometry with similar behavior as would be apparent to those skilled in the art to stiffen and strengthen portion 40 in an efficient manner that minimizes size and weight.

Figure 6:
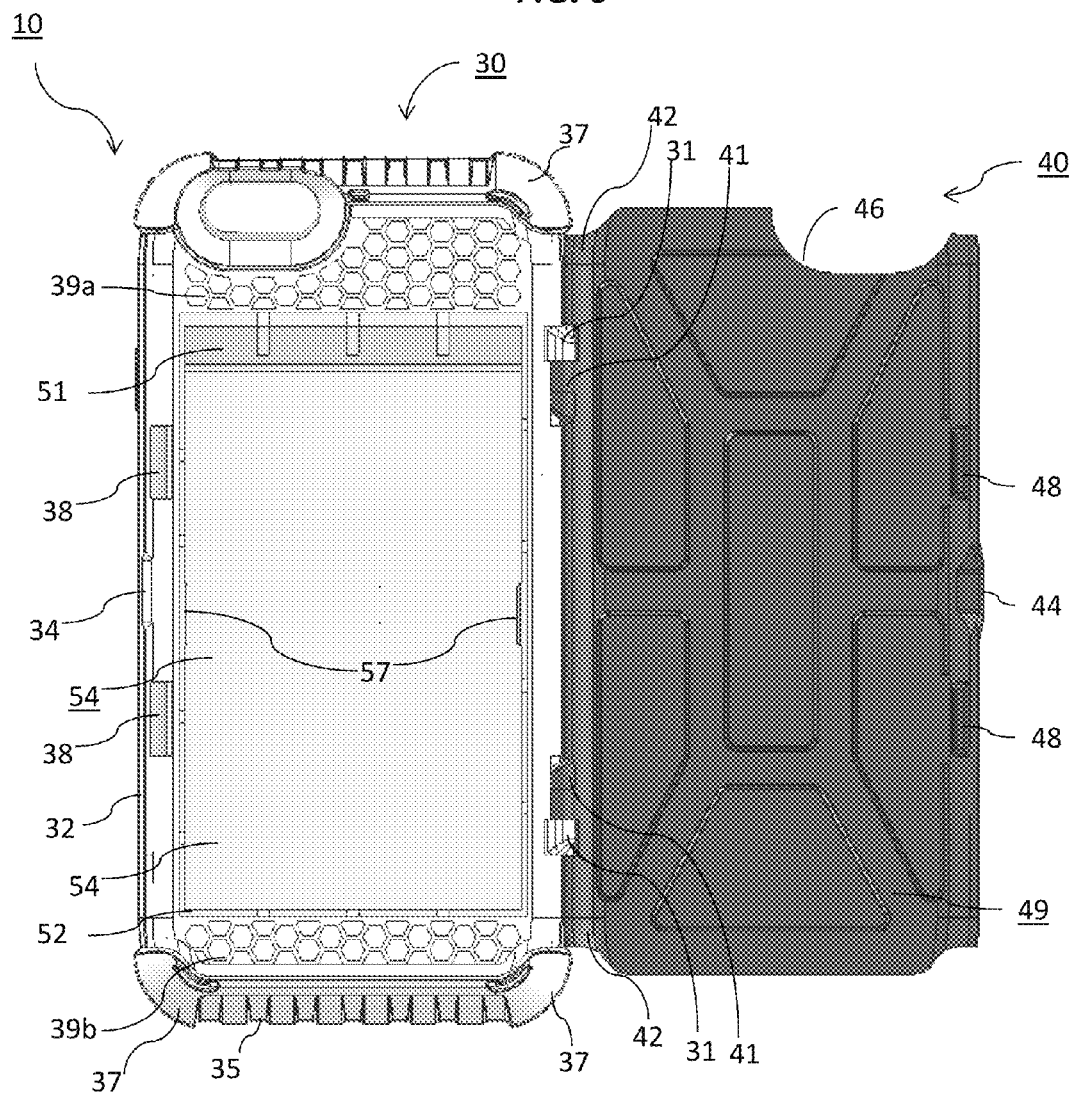
FIG. 6 is a rear plan view of the case in FIG. 1 showing its rigid and resilient portions assembled in an open position.

Similarly, FIG. 6 depicts case 10 in an opened position with portion 40 having been rotated approximately 180 degrees about fasteners 41 and 31 to render accessible internal cavity 50 for receipt of the tangible contents. In this view, retaining lip 57 of cavity 50 may also be seen being positioned on opposing lateral edges of cavity 50. Each lip 57 is operable to retain features such as business or credit cards inside cavity and avoid unintentional release therefrom or becoming otherwise loose (e.g. in the event multiple such contents are stacked).

Figure 8:
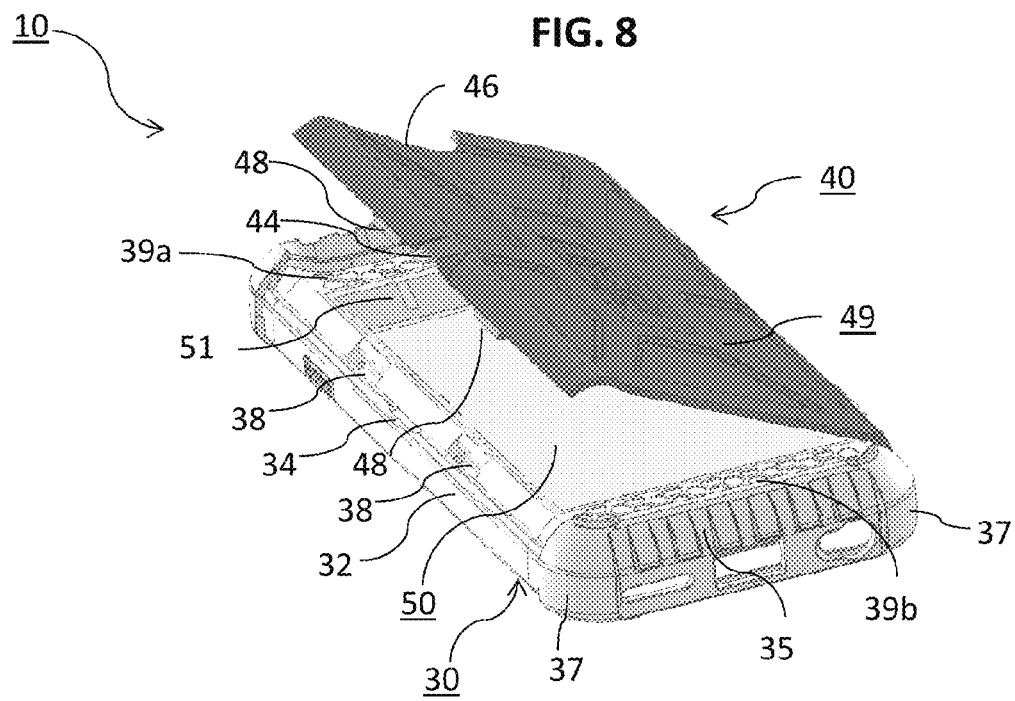
FIG. 8 depicts an upper perspective view of the case of FIG. 1 when in an opened position.
Figure 9:
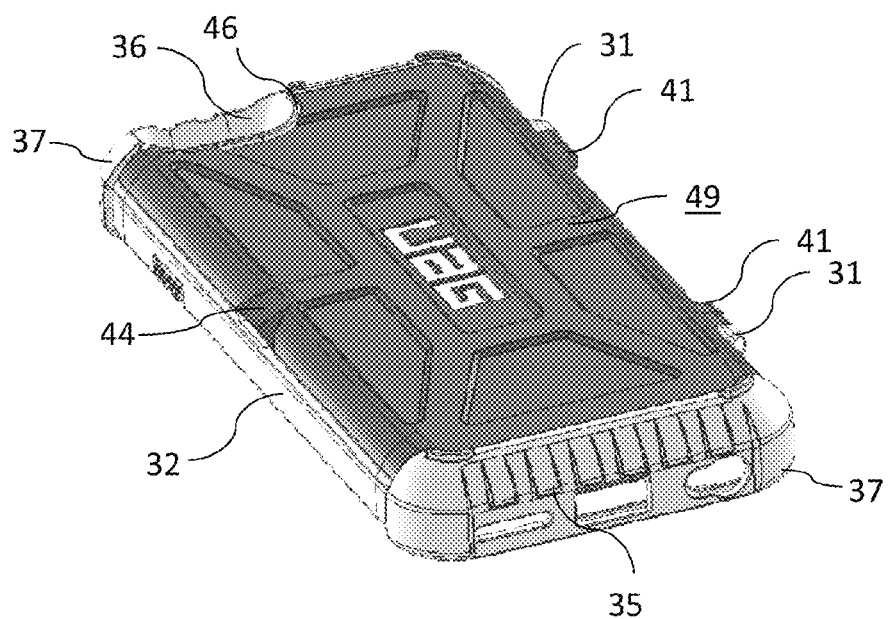
FIG. 9 depicts an upper perspective view of the case of FIG. 1 when in a closed position.

As previously discussed, FIG. 8 depicts a side perspective view when portion 40 is oriented approximately 45 degrees opened relative to portion 30 in an opened position. Any number of orientations may be used as needed or required and portions 30 or 40 may include adjustment mechanisms to allow portion 40 to remain in a fixed predetermined orientation (e.g. 45 degrees) or move between multiple predetermined orientations. As can also be seen in FIG. 9, portions 30 and 40 are oriented generally parallel with each other when case 10 is in the closed position.

Portions 30 and 40 may be constructed using any known manufacturing process including molding. While portions 30 and 40 have been described as being independent features detachably connected to each other, case 10 is not so limited and instead portions 30 and 40 may be integrally formed with each other as needed or preferred and may be fabricated from a variety of materials. As can also be seen throughout this disclosure, when device 20 is received and securely retained by portion 30 of case 10 and contents are received by cavity 50 formed between portions 30 and 40, case 10 and device 20 and contents in cavity 50 are substantially coexistive so that case 10 sufficiently protects both device 20 and contents disposed in cavity 50. This provides the unique advantage of transporting both valuable, personal effects in cavity 50 as well as device 20 in the same case while also avoiding injurious actions befalling device 20, including impacts, sharp objects, shock and scratches to the graphical user interface, display screen, or outer surfaces of device 20. Advantageously, the described case 10 amply protects device 20 yet does not interfere with access to actuators, ports, or the device 20's graphical display.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A composite case for an electronic device comprising:
 a resilient portion dimensioned to detachably receive the electronic device, the resilient portion comprising a rear planar surface dimensioned to cover a back portion of the electronic device and perimetral edges extended from the rear planar surface; and
 a rigid portion hingedly connected to the rear planar surface of the resilient portion, the rigid portion dimensioned to shield at least part of the rear planar surface of the resilient portion, the rigid portion being hingedly movable between open and closed positions;
 wherein a cavity is formed between the rigid portion and the rear planar surface of the resilient portion when the rigid portion is in the closed position, wherein in the closed position, one or more fasteners of the rigid portion are securely engaged with one or more associated fasteners of the resilient portion, wherein the one or more fasteners of the rigid portion are positioned on an edge opposite the one or more hinged fasteners of the rigid portion, and
 wherein the one or more fasteners of the rigid portion extend outwardly from the rigid portion and terminate with an inwardly extending lip.

2. The case of claim 1, wherein the one or more fasteners of the resilient portion are defined by a cutout of the perimetral reinforced structure dimensioned to receive and securely engage with the inwardly extending lip of the rigid portion.

3. The case of claim 2, wherein the one or more fasteners of the resilient portion flex inwardly when contacted by the inwardly extending lip and then flex outwardly to retain the inwardly extending lip in the closed position.

4. The case of claim 1, wherein the rigid portion comprises at least two fasteners that extend outwardly from the rigid portion with the inwardly extending lip,
   wherein disposed between the at least two fasteners of the rigid portion is an actuator surface extending away therefrom opposite the inwardly extending lip; and
   wherein the actuator surface is contoured operable to be moved by a user to move the case between closed and open positions.

5. A method of forming a case for protecting an electronic device comprising and storing portable contents, the method comprising:
   detachably engaging a resilient portion with a rigid portion, the resilient portion comprising a rear planar surface and perimetral edges extended therefrom;
   hingedly connecting the resilient portion to the rigid portion, the rigid portion being hingedly movable been open and closed positions;
   dimensioning the resilient portion to detachably wrap and securely receive the electronic device, the rear planar surface of the resilient portion being substantially coexistive with a rear surface of the electronic device;
   dimensioning the rigid portion to shield at least part of the rear planar surface of the resilient portion; and
   forming a cavity between the rigid portion and the rear planar surface when the rigid portion is in the closed position, the cavity being operably to detachably store the portable contents;
   hingedly connecting one or more fasteners of the resilient portion with one or more fasteners of the rigid portion across an adjoining perimetral edge;
   rotating the rigid portion about the hingedly connected fasteners to move the case between the open position to the closed position;
   aligning the rigid and resilient portions to be substantially parallel in the closed position;
   slidably inserting contents in the cavity when the case is in the open position;
   securely engaging the one or more fasteners of the rigid portion with the one or more associated fasteners of the resilient portion in the closed position, the one or more fasteners of the rigid portion being positioned on an edge opposite the one or more hinged fasteners of the rigid portion;
   extending at least two fasteners of the rigid portion outwardly therefrom and terminating in an inwardly extending lip; and
   dimensioning associated fasteners of the resilient portion with cutouts on the perimetral reinforced structure to receive and securely engage with the inwardly extending lip of the rigid portion in the closed position.

* * * * *